Jan. 15, 1935.　　　G. A. TILSHER ET AL　　　1,988,096
MACHINE FOR MANUFACTURING LOCK NUTS
Filed Feb. 5, 1932　　　6 Sheets-Sheet 1
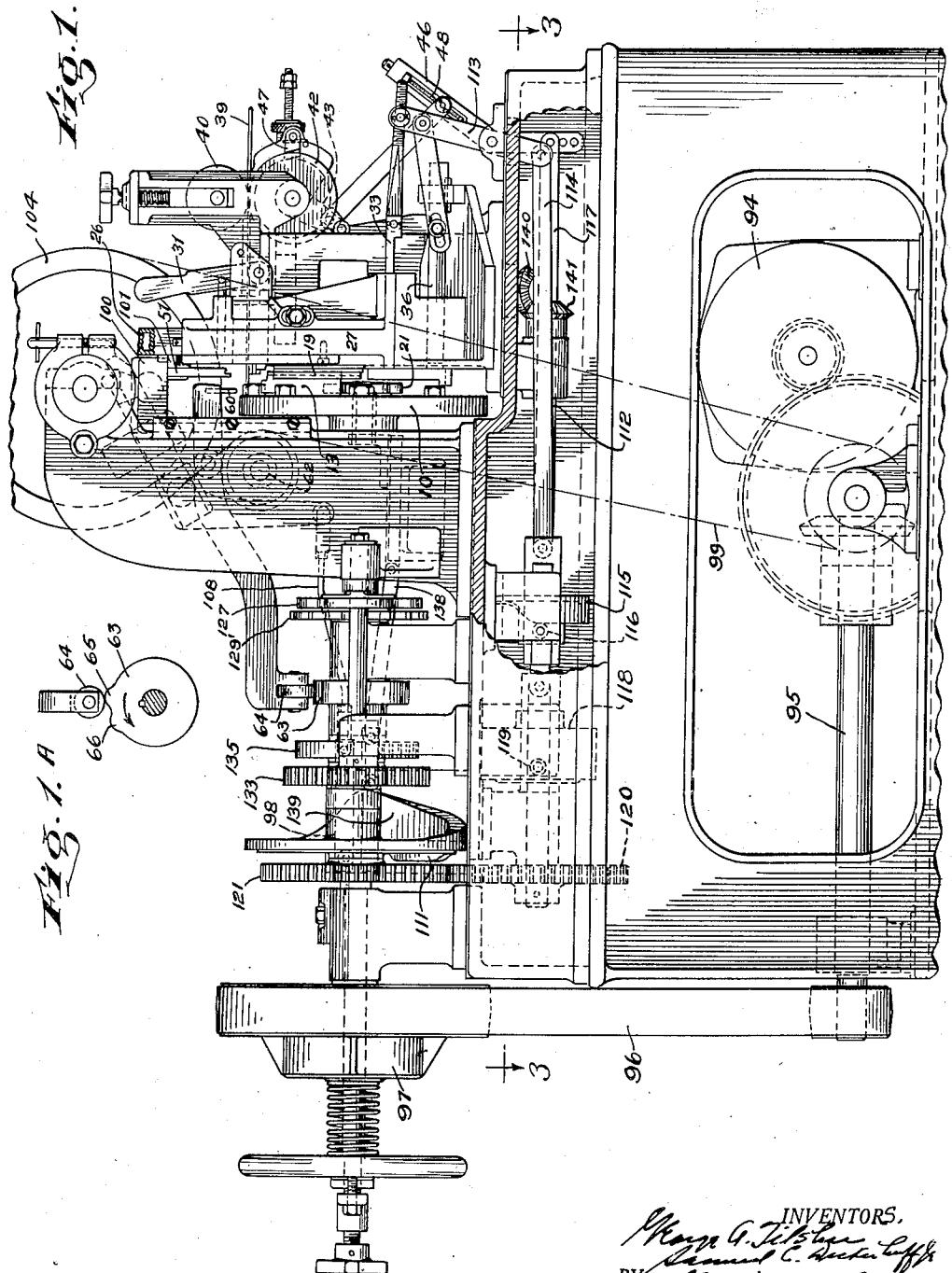

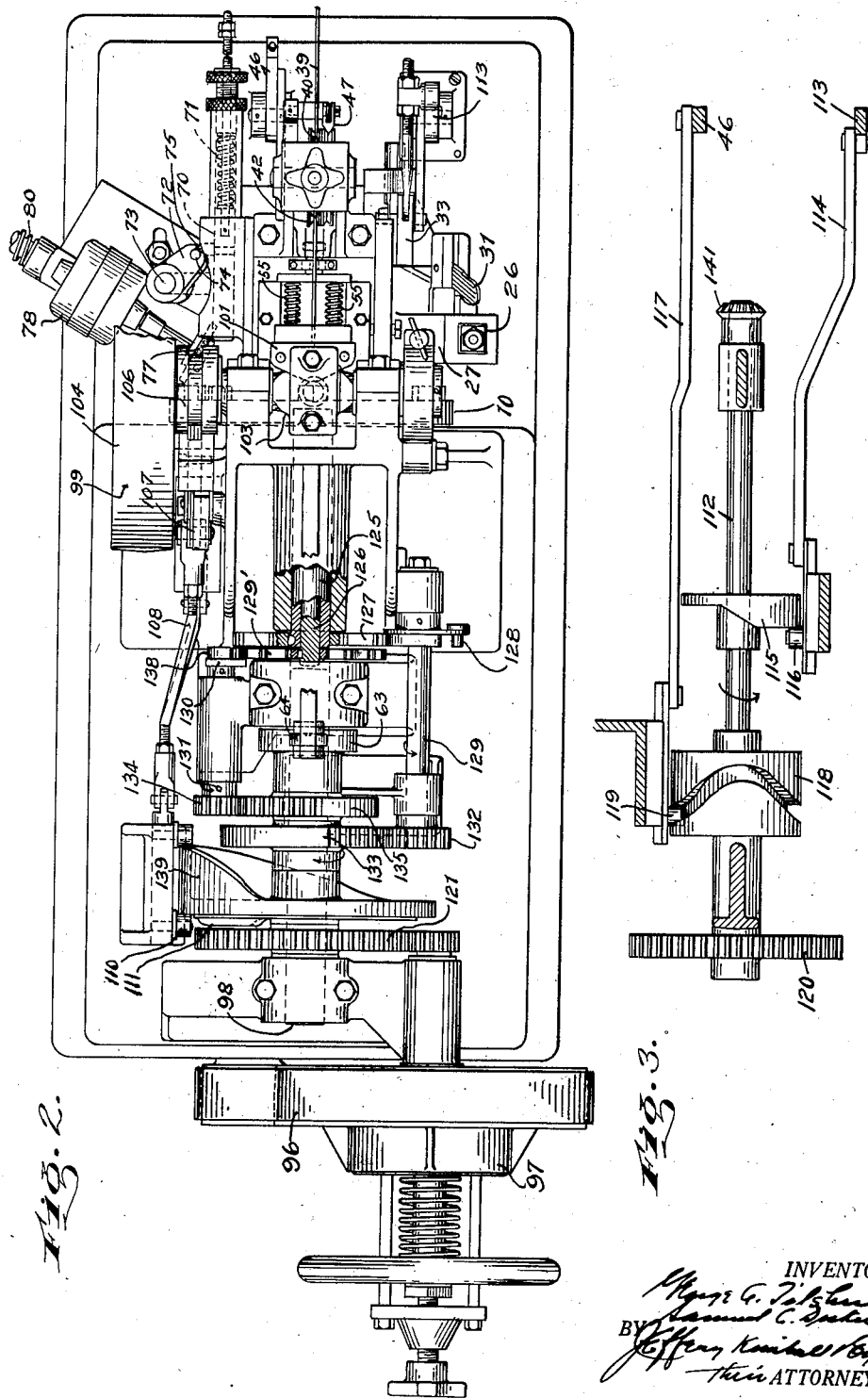

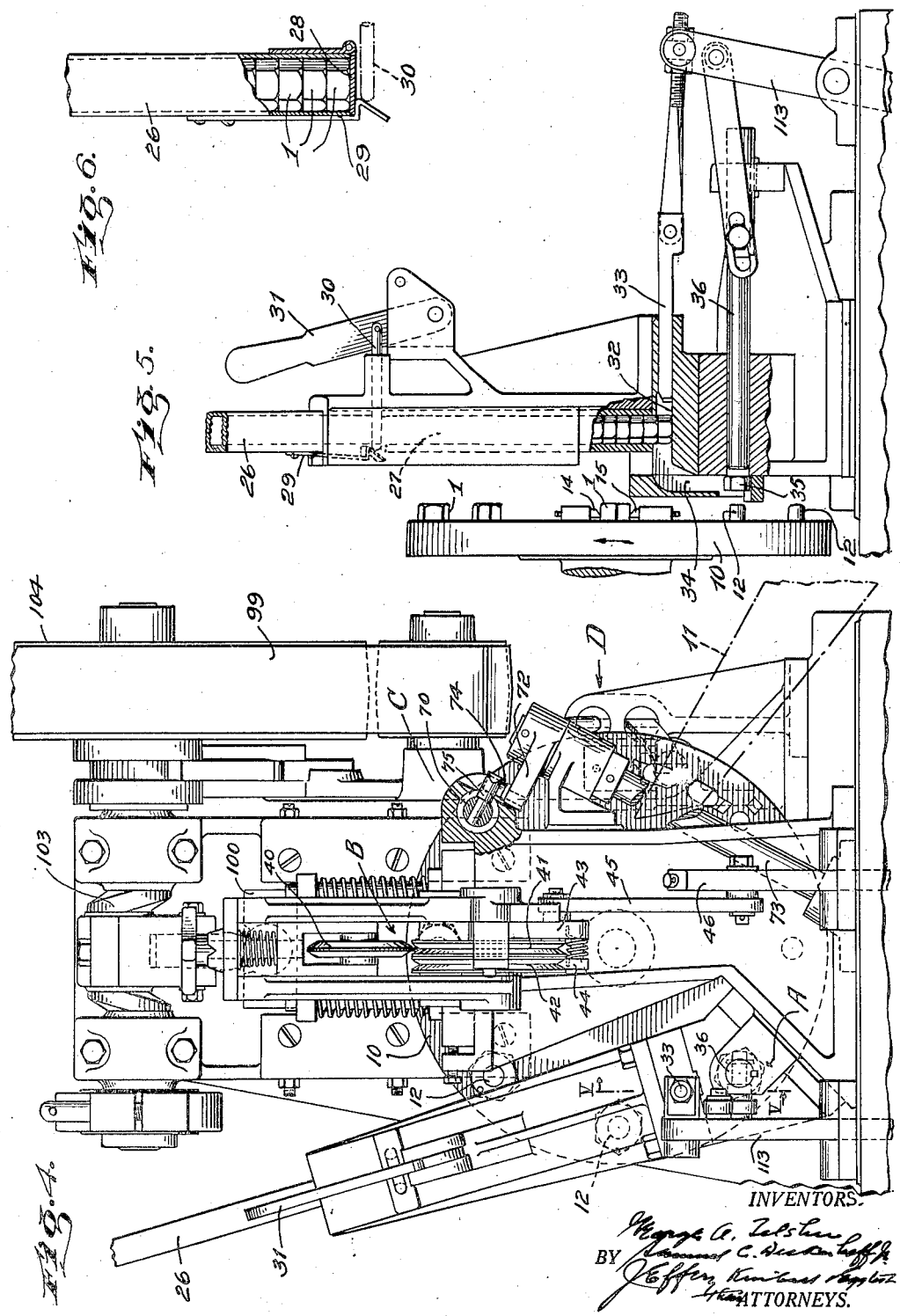

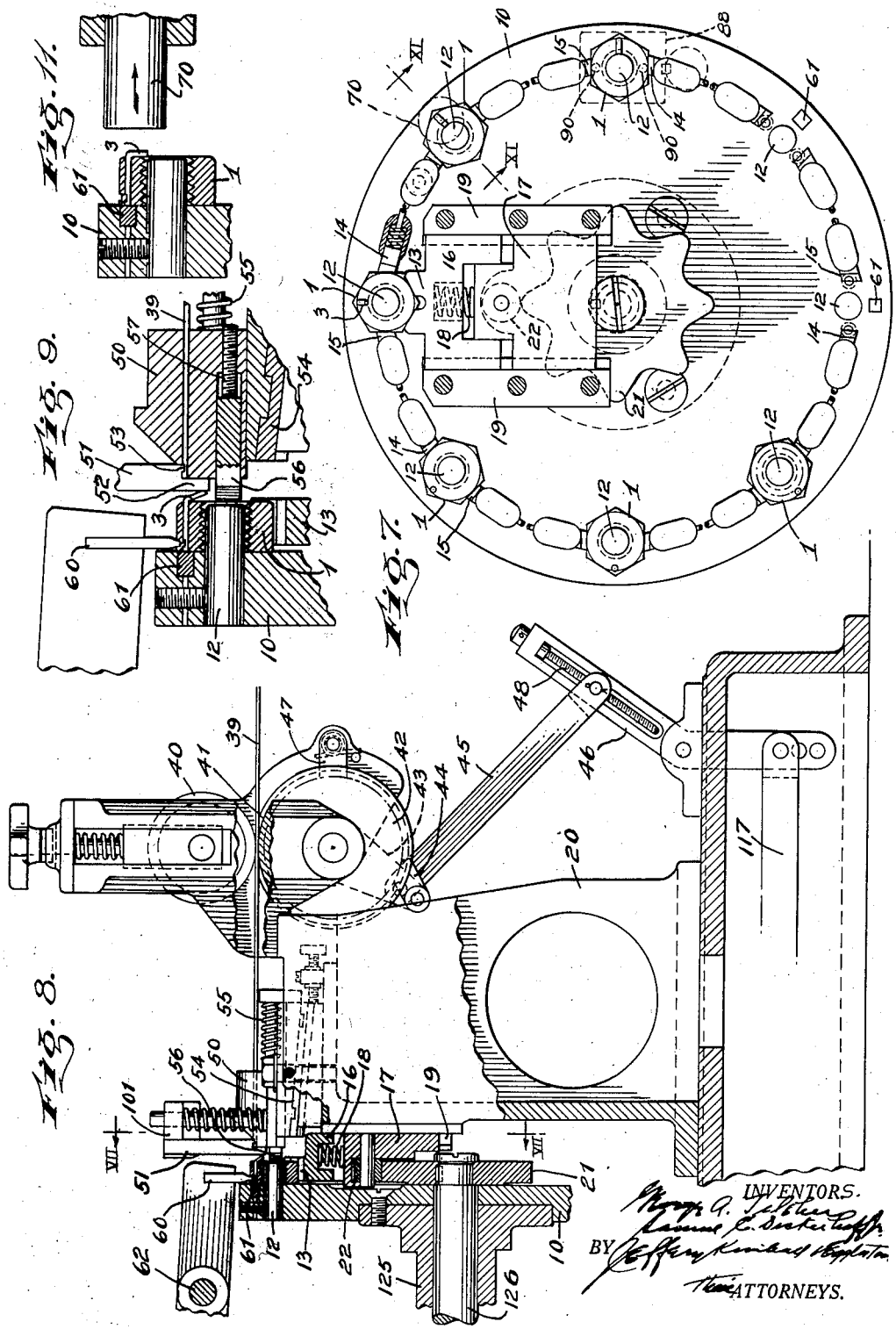

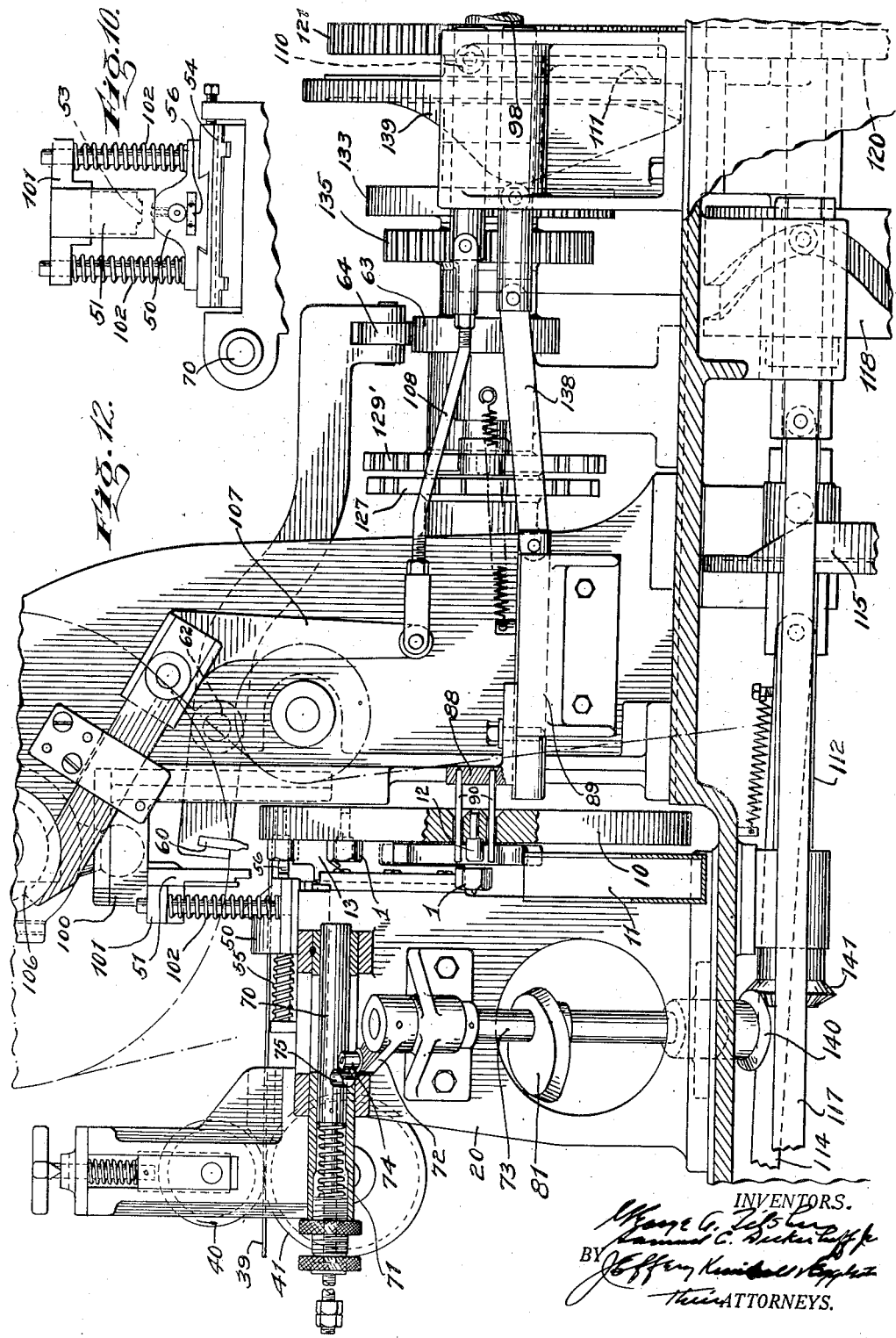

Jan. 15, 1935. G. A. TILSHER ET AL 1,988,096
MACHINE FOR MANUFACTURING LOCK NUTS
Filed Feb. 5, 1932 6 Sheets-Sheet 6
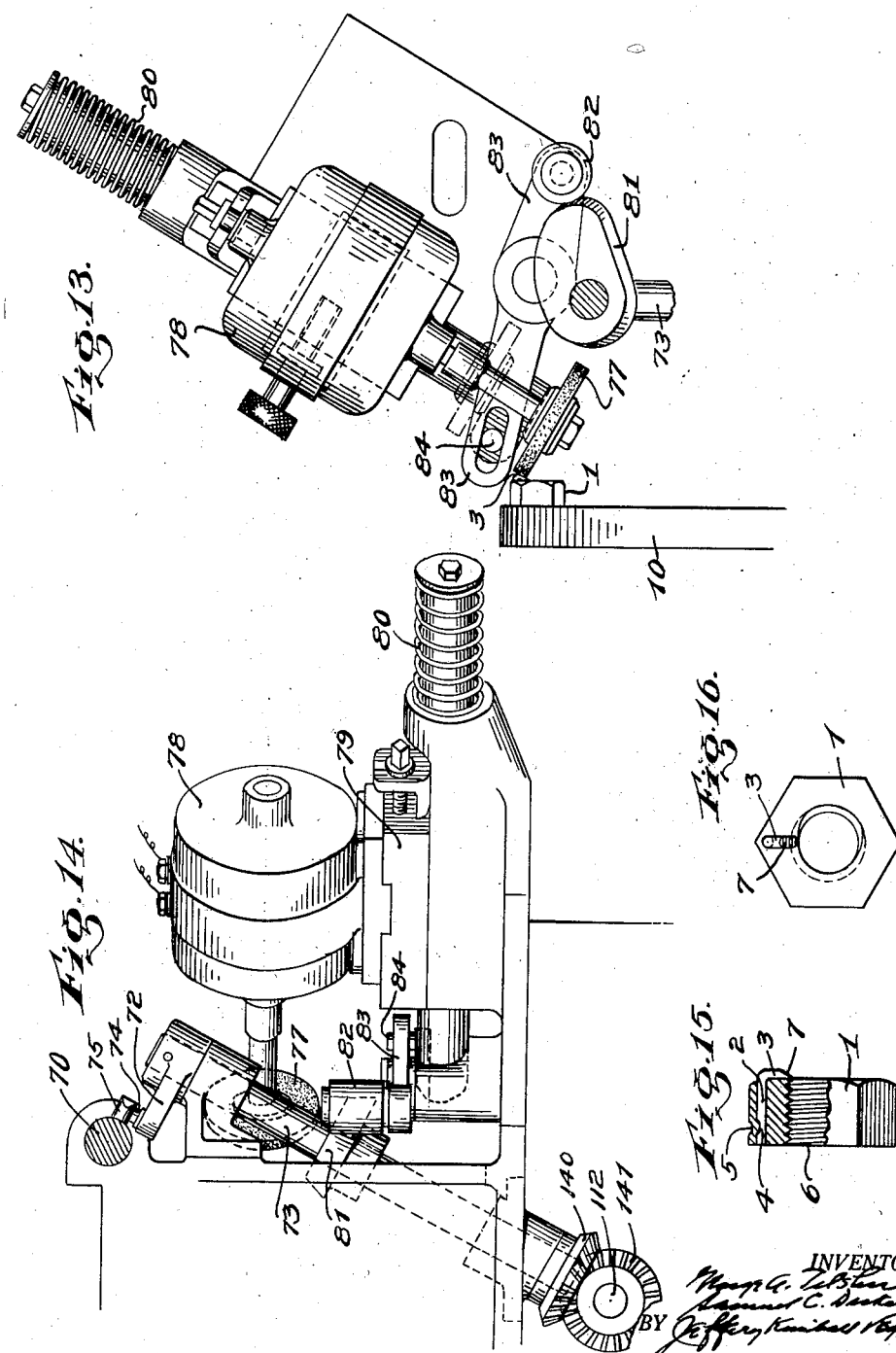

Patented Jan. 15, 1935

1,988,096

UNITED STATES PATENT OFFICE 1,988,096

MACHINE FOR MANUFACTURING LOCK NUTS

George A. Tilsher, Paterson, N. J., and Samuel C. Dickerhoff, Jr., New York, N. Y., assignors, by mesne assignments, to Automatic Nut Company, Inc., a corporation of New York Application February 5, 1932, Serial No. 591,010

41 Claims. (Cl. 10—72)

Our invention relates to machines and devices for making lock nuts of the type described and claimed in the Batchelor Letters Patent No. 1,423,746, dated July 25, 1922, and more particularly the lock nut of this type shown in the drawings herewith.

In its completest form, our invention contemplates a machine or device to take the nuts after the latter have been drilled or otherwise provided with a seat for the locking element or locking wire, and complete the nuts by inserting, cutting and forming the locking wires, fastening these wires in their seats, and, if necessary or desirable, somewhat sharpening or reducing those ends of the locking wires which are to engage the bolts. Various parts and devices of this complete machine, performing individual steps in the completing of the nut as appears hereinafter, are suitable for use by themselves, per se, separate and apart from the present general assembly, and in other combinations of devices however; such parts and devices individually constitute parts of our present invention also, as hereinafter appears in the claims.

Our invention will be understood from the embodiment of it illustrated in the accompanying drawings, in which: Fig. 1 is a side elevation (partly in section) of a machine taking drilled nuts, and inserting, cutting and forming the locking wires, fastening the wires in their seats, and somewhat sharpening the exposed ends of these locking wires. Fig. 1ª is a sectional view illustrating the cam operating the indenting hammer. Fig. 2 is a plan view, partly in section, of the machine of Fig. 1. Fig. 3 is a sectional view on the line III—III of Fig. 1. Fig. 4 is an end view of the head of the same machine. Fig. 5 is an elevation, partly in section, of the feeder of the machine illustrated, drawn to a somewhat larger scale. Fig. 6 illustrates one of the magazines by which the drilled nuts are brought to the machine illustrated. Fig. 7 is an elevation of the turret or nut carrier of the machine illustrated, together with the anvil to support the nuts against the blow of the indenting hammer. Fig. 8 is a sectional elevation adjacent the wire feed of the machine of Fig. 1. Fig. 9 is a sectional view showing on a larger scale the operation of the indenting hammer and wire cutter and indenting tool. Fig. 10 is a detail of the construction adjacent the wire cutting and indenting tool. Fig. 11 is a sectional detail of the mechanism for completing the bending of the locking wire. Fig. 12 is an elevation, partly in section, of the head of the machine of Fig. 1, but showing the side of the head opposite that shown in Fig. 1. Figs. 13 and 14 are respectively plan and elevation of the mechanism which sharpens the exposed end of the locking wire. Fig. 15 is a section elevation, and Fig. 16 is an end view, of the particular lock nut delivered by the machine of the foregoing figures.

Referring first to Figs. 15 and 16, which illustrate generally the particular nut delivered by the machine of the other figures: As there illustrated, the nut is an ordinary internally-threaded hexagonal nut 1, drilled parallel to its axis to receive the leg 2 of a locking wire 2—3; the leg 2 of this wire is indented at 4, and the wire is held in place by indenting or locally crushing down the side wall (or corner) of the nut body, as indicated at 5, until the material of the body of the nut more or less fills the recess 4; the opposite leg 3 extends more or less across the bolt opening 6 of the nut to engage the bolt. As represented at 7, the end of the leg 3 may be more or less sharpened or reduced so as to be able to extend into the threads of a bolt threaded to suit the threads of the nut 1. The foregoing will serve to illustrate the particular kind of lock-nut operated on by the machine of the remaining figures.

In brief, this machine has the nuts per se delivered to it, i. e. nuts without the locking wire 2—3, but ready drilled for the reception of the wire. These nuts are delivered successively to a nut carrier, which may have the form of a turret or disc 10, and thereby carried through a series of stations whereat the various operations are performed. The number of stations may vary, depending on the number of separate operations used to add the locking wire 2—3 to the nut per se and the number of these operations concentrated at any one operating station. In the present instance (Fig. 4) the nuts are delivered to the turret carrier 10 successively at station A; the wire is inserted, and locked into the nut body, and the protruding end of the wire somewhat bent or depressed toward the face of the nut, at station B; and this end or leg 3 is bent to its final position, substantially parallel with this face of the nut body, at station C; and at station D, the end of this leg 3 is sharpened or reduced (as at 7, Fig. 15,—for example by grinding), and the nuts are discharged successively, for example into a receiving chute 11. Incidentally, the locking wire may be, and preferably is, fed to the machine as from a reel, and is both cut to length, indented and shaped at this machine; the cutting to length and indenting (to provide the recess 4, Fig. 15), may be done at the wire-inserting station B, and substantially simultaneously with the inserting and locking of wires at this station. Preferably the carrier for the nuts, the turret or disc 10 in the present instance, which carries the nuts through the successive stations, carries these nuts forward intermittently step by step, the successive nuts being held at rest at the successive stations while the various operations at these stations are carried out. To hold the nuts, this carrying means may have a series of posts, such as the posts 12 projecting from the turret carrier 10, on to each of which one nut can be slipped; when the nuts are carried with such an arrangement however, it is desirable to provide the nuts with an anvil or supplemental support (at station B) to resist the blow of the hammer or other force crushing down or indenting the wall of the nut to lock the wire in place; this to prevent this force flattening the threads of the nut against the posts 12, or being driven into these posts; such an anvil or supplemental support for the nuts is shown at 13, in Figs. 1, 7 and 12.

As before indicated, the nut carrier in machine illustrated consists principally of a rotary disc 10 provided with projecting posts 12 on to which the nuts are slipped. The nuts must be presented at the station B with the drilled hole in position to receive the wire of course. To accomplish this, we arranged to have the nuts slipped on to the successive posts in proper position, and then provide bevelled spring-pressed slides 14 and 15, a pair for each post 12 (bevelled to permit the nuts being slipped into place between them) and bearing against opposite flat faces of the nut, as will be understood from Fig. 7. Such slides prevent the nuts from turning on the posts of course. The anvil or supplemental support 13 for the nuts may be provided in various ways, as will be evident. Preferably however the anvil is movable into engagement with each nut as the latter is brought to rest at the nut-indenting station, and is moved away from the nut when the operations are finished at this station, permitting the nut to pass on and the succeeding nut to be brought into position at this station, without interference from the anvil. The specific anvil 13 employed in the machine illustrated consists of two sliding blocks 16 and 17 (see Fig. 7), separated by a rather heavy spring 18, and mounted to slide in guides 19 carried by the stationary bracket 20 arising from the machine base; an intermittently rotating star wheel 21 and follower-roller 22 carried by the sliding block 17, serve to thrust the anvil underneath each nut as it arrives at station B, and permits the anvil to drop away from the nut, by its own weight, when the indenting of the nut is finished at this station. It will be observed from Fig. 7 particularly that the anvil 13 has two angularly-disposed faces to engage different faces of the nut; in addition to supporting the nut against the blow of the nut-indenting hammer for example, such a device acts more positively and exactly than the slides 14 and 15 to position the nut to receive the wire, and the stroke of the indenting hammer for example, and may be employed for the purpose of exactly positioning the nut, at any station where rather exact positioning is required, regardless of whether or not it is employed also as a supplemental support, as against the blow of a hammer for example.

The ready-drilled nuts may be brought and fed to the machine in various ways, as will be obvious. In the present instance, the ready-drilled nuts are assembled in square or hexagonal carrying tubes 26 (each nut being properly placed therein with respect to the location of the drilled hole which is to receive the locking wire), and therefrom dropped into a more or less similarly shaped magazine or trough 27 (Fig. 5). For convenience of charging and unloading the carrying tubes 26, these are provided with hinged bottoms 28, normally held closed by a spring latch 29 which, when the carrying tube is in place in the magazine 27, (Fig. 5), is pressed outwardly by a sliding rod 30 and its operating handle 31, so that the bottom 28 springs open under the weight of the nuts in the carrying tube, and these nuts thereby allowed to escape from the carrying tube 26. Below the magazine 27 the nuts come to rest successively on a floor 32 along which the pusher 33 pushes the nuts one at a time (as frequently as the turret carrier 10 advances a step), the nuts successively following the curved guide or path 34 so as to come to rest in the position indicated at 35 in Fig. 5, that is to say, facing the turret carrier 10. A plunger 36 is reciprocated to thrust each nut on to the carrier (or rather on to one of the posts 12 of this carrier 10) each time the carrier 10 comes to rest with one of these posts at station A. Incidentally, since the nuts 1 are all arranged alike in the carrier tubes 26 (arranged alike that is to say, so far as concerns the drilled holes for receiving the locking wires), it is obvious that all the nuts will occupy like positions on the turret carrier 10; for example, all the nuts 1 may be so positioned that the corners of the nuts which are drilled to receive the wires, may be nearest the periphery of the disc 10, as illustrated in Fig. 7, it being assumed that the wire-feeder is arranged to feed wire toward the corners of the nuts occupying this position.

As before indicated, the locking wires are inserted, cut to length, indented, and fastened in place in the nuts, all at station B of the machine illustrated, the wire being given to the machine on reels for example. To feed the wire 39 into the nuts, we pass it between two oppositely V-ed rolls 40 and 41 (Figs. 4 and 8), one of which rolls, e. g. roll 41, is turned intermittently sufficiently to insert a length of wire into a nut, while the other roll, e. g. roll 40, is adjustably spring-pressed toward the wire and driving roll; the intermittent advance is made while the nut is at rest at the inserting station B; obviously the roll 41 can be given its intermittent rotation by various types of mechanism, but in the present instance it is driven by a friction type pawl and ratchet mechanism; a smoothly grooved, or smooth faced, roll 42 is fastened against the driving wire roll 41 while a swinging arm 43 is provided with a pawl 44, the end of which is spring-pressed against the smooth face of the "ratchet" 42, so that each oscillation of the swinging arm 43, for example, oscillation by the link 45 and bell crank lever 46, causes the wire rolls to advance the wire a corresponding distance; a friction brake 47, engaging the "ratchet" 42 acts to restrain backward movement of the wire rolls and to limit the forward movement of these rolls to a distance corresponding to the throw of the pawl;

by the threaded connection 48 of the link 45 to lever 46, the effective length of the upper arm of this lever, and correspondingly the throw of the pawl 44, with each oscillation of the arm 43 (and hence the length of the wire fed with each movement of the lever 46) is subject to ready variation by the attendant of the machine, as will be apparent. As the wire 39 is fed forward, it passes through a guide block 50, and thence to the cutting and wire-indenting tool or tools 51, which has two operating edges, faces or portions, the portion 52 which acts to shear the wire at the face of the guide block 50 nearest the nut, when a proper length of wire to form a locking element has been inserted into the nut then at this station B (see Fig. 9) and a portion 53 to form an indentation adjacent the cut made by 52; this indentation in the wire is of course the indentation by which the locking wire for the next succeeding nut is to be fastened into the latter. In order that the leg 3 of the locking wire may be cut just exactly the proper length, regardless of any variation in thickness of the nuts, there may be (we have found that these may vary somewhat in thickness), we mount the cutting tool 51—52 on a sliding carriage 54 which is pressed toward the nuts at station B by a spring or springs 55, and which is provided with a projecting nose 56 for engagement with the face of the nuts as the latter arrive at this station; the cutting tool 51—52 cuts off the wire at a certain given distance from the adjacent face of the nut, this distance being determined by the distance the nose 56 projects from the carriage; for convenience, the distance the nose projects may be made adjustable, as illustrated by the screw-backing 57, shown particularly in Fig. 9; for any given setting of the nose 56, the wires of all the nuts passing station B will be so cut that the legs 3 are of equal length. As appears best in Fig. 9, we usually so set the wire-indenting tool or portion 53 that the latter comes into action after the shear portion 52 has made its cut, and while this shear is still extending across the newly cut end of the wire; in order to completely assure the proper positioning of this indenting in the wire, the wire-propelling rolls 40 and 41 may still be in action to propel the wire forward at the time the indenter 53 strikes the wire, the driving roll 41 slipping under the wire while the shear portion 52 still stands in front of the newly cut end of the wire. With such a movement of the wire-driving roll 41, it is obvious of course that this roll is seeking to drive the wire forward deeper into the nut, at the time the shear 52 acts to cut the wire; assuming that the wire-driving roll 40 is brought into motion adequately soon after a new nut is brought to station B, it is apparent of course that this prolonged action by the wire driven roll 41 will serve to hold the wire inserted as deeply as possible into the nut at the time the hammer 60 acts to indent the nut wall, i. e. crush the wall of the nut into the notch in the wire (5 into 4, Fig. 15), and thus hold this notch directly beneath the point at which the hammer is to strike. The carrier 10 is subject to considerable wear at those points struck by the ends of the wire 39 thrust through the nuts; to minimize this wear as much as possible, specially hard metal blocks 61 are usually set into the carrier 10 at these points. The hammer, of which 60 is representative, may assume various forms, as will be evident. In the present machine, this hammer 60 is a pivoted hammer, pivoted at 62, and actuated by a cam 63 rotating on a driven shaft later mentioned again; a follower-roller 64 on the hammer lever directly engages cam 63; rather than make the whole indentation of the nut wall by a single stroke, we found it better, for the larger nuts at least, to do this work with two or more strokes, each successively deeper than the preceding stroke; for this reason, the second projection 65 of cam 63 is somewhat higher than the cam projection 66 which causes the hammer to make its first stroke in each rotation of the cam 63; this cam 63 rotates in the direction indicated by the arrow in Fig. 1ª, and it will be understood that the strokes of the hammer are sufficient to sink the metal of the wall of the body of the nut into the indentation in the wire, substantially as illustrated in Fig. 15, or sufficient for the purpose.

Usually the action of the shear 51—52 will bend the leg 3 of the locking wire somewhat toward its final desired position. Rather than use the tool 51, or another tool at the same station, to complete the bending operation of this leg 3 of the wire, we found it preferable to do, or at least finish, the bending of the wire at another station,—here the station C, as before indicated. At this station C therefore we have a hammer 70 which delivers a relatively heavy blow straight on to the face of the nut and against the radial leg 3 of the wire, thus bending the latter down to its final position as illustrated in Fig. 11. As with respect to the hammer 60, this hammer 70 may assume various forms; in the machine illustrated, this hammer is in the form of a rather heavy reciprocating rod thrust toward the nut by a spring 71 and retracted, after each stroke, by an arm 72, projecting from the constantly rotating shaft 73; the roller follower 74 on the arm striking, once in each rotation of the arm, the pin 75 projecting from the sliding hammer 70, and thereby retracting the hammer 70 prior to each new blow. The shaft 73 is driven in such a manner that the hammer 70 makes a new blow each time a nut is brought to rest at this station C, of course, and for this purpose, the shaft 73 may be driven in the manner hereinafter described.

The nut is now finished, unless it is desired to sharpen or reduce the end of the locking wire (as indicated at 7, Fig. 15, for example). Such sharpening can be done at a station for sharpening alone, but is conveniently done by grinding, and the grinding, being by a momentary operation, can be done at the station where other operations are performed; preferably after the leg 3 of the wire has been finally placed down against or parallel to the face of the nut (as by the hammer 70); specifically, the grinding apparatus is readily employed at the station where the finished nut is taken from the nut carrier or turret 10, e. g. station D. For reducing the end of the leg 3, (as at 7, Fig. 15), the present machine employs a grinding wheel 77, which is most conveniently driven by providing it with its own electric motor 78. In order that the grinding wheel may perform its functions, but not interfere with the motions of the nut, we mount this motor with the grinding wheel on a sliding carriage 79 which can move the grinding wheel between the positions illustrated by the full and broken lines in Fig. 13; a spring 80 may thrust the carriage toward grinding position (full line position in Fig. 13) while a cam 81 on the constantly rotating shaft 73 before mentioned operates against a follower roller 82 on a lever 83 having a slot and pin connection 84 with the carriage 79, serves to direct the carriage into the dotted line position illustrated in Fig. 13 at such times as movement is required for the nut to, at or from this station D. In the present machine, the finished nuts are discharged from the turret-carrier 10 at this station D, as before pointed out. To discharge the nuts, a reciprocating frame 88 carried in stationary guide 89, carries a pair of fingers 90 which, when this frame is thrust toward the left in Fig. 12, pass through the turret-carrier 10 at opposite sides of the particular post 12 then at the station D, and thus push the finished nut from the post at this station, the nut dropping into the chute 11 as before pointed out. The frame 88 and fingers 90 are retracted (toward the right in Fig. 12) before the turret-carrier 10 is called on to make its next step in advance of course.

The devices and mechanisms so far described can be driven and operated in various ways, as will be apparent. In the machine illustrated: the power for driving the whole machine is furnished by a motor 94 (Fig. 1) which, through gearing, a lay shaft 95, a belt 96 and clutch 97, drives a main shaft 98 (see Fig. 2) through which various of the mechanisms so far described are driven, while through a gearing and belt 99 the motor 94 drives a press, the head 100 of which rests on and, at the proper times, drives downwardly the head 101 carrying the wire-cutting and wire-indenting tool 51; as will be understood from the foregoing the head 101 is mounted on the carriage 50 before referred to. This head 101 is carried on a pair of rods rising vertically from this carriage 50; and provided with springs 102 which support the head 101 in constant engagement with the press head 100. Generally speaking, the press may assume various forms, as is well known, and the construction of the particular press we employ need not be described in detail; in general, its head 100 is suspended from a crank shaft 103 which is adapted to be clutched at will to the fly-wheel 104 which is driven continuously by the motor 94 and belt 99 before referred to; normally the press head 100 remains at rest in its upper position of Figs. 1, 4 and 14, but as the clutch at 106 is actuated by lever 107 under the pull of link 108, the crank shaft 103 is coupled to the fly wheel 104 for one revolution, and the head 100 (and hence the shear 52 and the wire-indenting tool 53) makes one stroke; the link 108 is actuated at the proper time by the engagement of its follower roller 110 with a face cam 111 carried by the constantly rotating shaft 98. The nut-feeding plungers 33 and 36, and the wire-feeding lever 46 are both operated by a cam shaft 112 underneath the bed of the machine. Both nut plungers 33 and 36 are coupled to a lever 113 which is attached to a link 114 actuated by a face cam 115 on the cam shaft 112; the follower roller 116 on the slide or link 114 is in direct engagement with this face cam 115. Likewise, the wire feeding lever 46 is connected to a link 117 which is actuated by the cylindrical cam 118 also on the cam shaft 112; the follower roller 119 rests in the groove in this cam 118. The cam shaft 112 is driven by the gear 120, which meshes with the driving gear 121 of the main driving shaft 98. The nut turret carrier 10, is mounted on a hollow shaft 125, while the star wheel 21 which lifts the anvil 13 and, alternately, permits this anvil to fall out of engagement of the nuts at station B, is mounted on the inner shaft 126. The outer shaft 125 is driven by a Geneva wheel 127, the driving pin or pin wheel 128 of which is mounted on shaft 129, while the inner or star wheel shaft 126 is driven by Geneva wheel 129', the pin wheel 130 of which is mounted on shaft 131. Shaft 129 is provided with a gear 132, which meshes with the constantly rotating gear 133 which however is provided with teeth over only a part of its periphery; likewise, shaft 131 is driven by a gear 134 which meshes with a gear 135 fast on the driving shaft 98, but which gear 135 is provided with teeth over only a portion of its periphery. As a result of employing mutilated gears such as 133 and 135, and the Geneva wheels 127 and 129', the movements of the turret carrier 10 and star wheel 21 are made at rather high velocity while the periods of dwell, between movements, are quite long, which of course is desirable in a machine operating step by step as does the present machine. The slide 88, the fingers 90 of which thrust the nuts from the turret-carrier 10, is operated by a link 138 and the face cam 139 which is fixed on the main driving shaft 98. By bevel gears 140 and 141 on the adjacent ends of shafts 73 and 112, the former is driven by the latter.

It will be understood that the various mechanisms are arranged to operate at the proper times, each with respect to the others. In brief, the operations are as follows: While the turret-carrier 10, is at rest (the non-toothed portion of gear wheel 133 being adjacent the gear 132, Fig. 2), the nut-feeding plunger 36 operates to thrust a nut onto the adjacent post of the turret-carrier 10; at about the same time, the nut plunger 33 operates to place a new nut in front of the plunger 36. Also while the turret-carrier 10 is at rest, and while the star wheel 21 is at rest in the position illustrated in Fig. 7, (the non-toothed portion of gear wheel 135 being adjacent the gear 134, Fig. 2), the wire-feeder mechanism is actuated to advance the wire 39 into the nut then standing at station B. As soon as this has been accomplished, hammer 60 operates, striking two blows to indent the nut into the recess previously provided in the wire. Almost as soon as the hammer has operated, the press operates, head 100 coming down and thereby causing the tool 50 to first cut the wire (and slightly bend the leg 3 toward the face of the nut), and then (acting through its portion 53) indent the wire still in the guide 50. While all this is going on at station B, the hammer 70 at station C has operated to finish the bending of the leg 3 of the wire of the nut which is then located at station C. And, at the same time, the grinding attachment (Figs. 13 and 14) has advanced to grind or sharpen the end of the wire of the nut at that time at station D, and as soon as this grinding attachment retreats, the slide 88 is brought forward to pass its fingers 90 through the turret-carrier 10, (Fig. 12) to discharge the finished nut at station D. As soon as all these operations have been performed at the various four stations, the star wheel 21 is turned sufficiently to drop the anvil out of contact with the nut at station B, and while the anvil is out of contact with the nut at this station, the turret-carrier 10 is turned sufficiently to advance each nut one station. As soon as the turret completes this forward motion, the star wheel acts to again bring the anvil into contact with the (now next) nut at station B, and the foregoing operations are repeated.

While in the machine thus described the various devices and mechanisms for feeding, operating on, and discharging the nuts from the turret nut-carrier 10 are mounted in fixed positions with respect to the bed or base of the machine, and the nut-carrier moves on the bed or base to carry the nuts through the various operating stations (this being the preferred arrangement, as apparently the simpler), it is obvious that this arrangement is subject to reversal, and the claims which follow are to be understood accordingly.

In general, it will be understood that our invention is not limited to the embodiment of it illustrated in the accompanying drawings and above described, except as appears hereinafter in the claims.

1. In a lock nut machine, means to insert locking wires into apertures in the nuts at one side of the threaded bores of the nuts, leaving a portion of each wire protruding from its nut, means to bend the protruding portion of the wires, and a nut-carrier to carry the nuts from said inserting means to said bending means.

2. In a lock nut machine, means to insert locking wires into apertures in the nuts at one side of the threaded bores of the nuts, leaving a portion of each wire protruding from its nut, means to bend the protruding portions of the wires, means to discharge the nuts from the nut-carrier hereafter mentioned, and a nut-carrier to carry the nuts from said inserting means to said bending means and thence to said nut-discharging means.

3. In a lock nut machine, means to provide the nuts with inserted locking wires, one end of each wire protruding from its nut and being somewhat bent, means to bend said bent protruding ends of the wires to their final positions, and a nut-carrier to carry the nuts from the first mentioned means to the second mentioned means.

4. In a lock nut machine, a nut-carrier to receive nuts substantially successively, means to insert locking wires into apertures in the nuts at one side of the threaded bores of the nuts, leaving a portion of each wire protruding from its nut, means to bend the protruding portions of the wires, and driving means to operate said nut-carrier to carry the nuts from the point of reception to said inserting means and thence to said bending means.

5. In the method of making a lock nut, the steps of inserting a long length of wire into an aperture provided therefor in the nut and locking the wire therein, then cutting the wire, leaving a portion of the wire locked in the nut with a part protruding from the nut as an exposed leg and somewhat bending the exposed leg of the length of wire locked in the nut, and thereafter bending the exposed leg of the wire to its final position.

6. In a lock nut machine, means to feed a long length of wire and insert one end thereof into an aperture provided therefor in a nut, means to lock the long length of wire in the nut, and means to cut the wire externally of the nut, leaving a portion of the wire locked in the nut, with a part thereof protruding as an exposed leg, and to somewhat bend the exposed leg of the piece of the wire left in the nut, said means being located at one portion of the machine, means located at another portion of the machine to bend said exposed leg to its final position, and a nut-carrier to carry the nut with its inserted bent wire from the first mentioned portion of the machine to the second mentioned portion of the machine.

7. In a method of making a lock nut of the kind described, the steps of providing the nut with a locking wire with the exposed leg thereof, which is to engage the bolt, located in its final position, and thereafter reducing the end of said leg.

8. In a method of making a lock nut of the kind described, the steps of providing the nut with a locking wire with the exposed leg thereof, which is to engage the bolt, located in its final position, and thereafter grinding the end of said leg to reduce the size of said end.

9. In a lock nut machine, means to insert locking wires into apertures in the nuts at one side of the threaded bores of the nuts, leaving a portion of each wire protruding from its nut as an exposed leg, and to bend the exposed legs of the wires to their final positions, means to reduce the ends of the exposed legs of the wires, and means to actuate said end-reducing means to reduce the ends of the exposed legs after said exposed legs have been bent to their final positions.

10. In a lock nut machine, means to insert locking wires into apertures in the nuts at one side of the threaded bores of the nuts, leaving a portion of each wire protruding from its nut as an exposed leg, and to bend the exposed legs of the wires to their final positions, means to reduce the ends of the exposed legs of the wires, said wire bending and end-reducing means being located at different stations, and a nut-carrier to carry the nuts from the wire-bending means to said end-reducing means.

11. The subject matter of claim 10, in combination with means to discharge the nuts from said nut-carrier, said nut-discharging means operating at the same station as said end-reducing means.

12. The subject matter of claim 10, characterized by the fact that said end-reducing means is a grinder, in combination with means to move said grinder into and out of operating position.

13. In a lock nut machine, a nut-carrier, a feeder to feed nuts to said carrier at one point in the path of travel of said carrier, means at a later point in the path of travel of the carrier to insert locking wires into apertures provided therefor in the nuts at one side of the threaded bores of the nuts, leaving a portion of each wire protruding from its nut as an exposed leg, and means to bend the exposed legs of the locking wires at a still later point in the path of travel of said carrier.

14. In a lock nut machine, a nut-carrier, a feeder to feed nuts to said carrier at one point in the path of travel of said carrier, means at a later point in the path of travel of the carrier to insert locking wires into apertures provided therefor in the nuts at one side of the threaded bores of the nuts, leaving a portion of each wire protruding from its nut as an exposed leg, means to bend the exposed legs of the locking wires at a still later point in the path of travel of said carrier, and means to reduce the size of the ends of the exposed legs of the locking wires at a further later point in the path of travel of said carrier.

15. In a lock nut machine, means for fastening locking wires in apertures provided therefor at one side of the bolt holes of the nuts, and a nut carrier, to cooperate therewith, including a plurality of posts to enter the bolt holes in the nuts and holders to engage the sides of the nuts to prevent the latter turning on the posts, said holders being sliding members beveled to permit the nuts being thrust onto the posts and between cooperating sliding members.

16. In a lock nut machine, means for operating against the side walls of the nuts, a nut carrier, to cooperate therewith, including a plurality of posts to enter the bolt holes in the nuts, said means operating against the nuts in a direction transverse to said posts, and supplemental means to engage side walls of the nuts at the opposite sides of said posts from the first mentioned means to support the latter against thrusts imposed on the nuts by the first mentioned means in a direction transverse to a post.

17. The subject matter of claim 16, characterized by the fact that means other than said carrier are provided to support said supplemental means.

18. The subject matter of claim 16, in combination with means other than said carrier to support said supplemental means, said supporting means being fixed in position with respect to the first mentioned operating means and including means to move said supplemental means into supporting engagement with the nuts successively as the nuts approach said operating means.

19. In a lock nut machine, means for inserting locking wires into apertures in the nuts extending substantially parallel to the bolt holes in the nuts, a hammer to indent the walls of the nuts adjacent said apertures to lock the wires therein, and means to cause the hammer to strike a plurality of times at each nut.

20. In a lock nut machine, means for inserting locking wires into apertures in the nuts extending substantially parallel to the bolt holes in the nuts, a hammer to deform the nuts to lock the wires therein, and means to strike the hammer a plurality of times against the same place on each nut.

21. In a lock nut machine, means for inserting locking wires into apertures in the nuts extending substantially parallel to the bolt holes in the nuts, a hammer to deform the nuts to lock the wires therein, and means to strike the hammer a plurality of times against the same place on each nut, said hammer operating means requiring the hammer to move deeper into each nut on the later stroke or strokes than on the first stroke or strokes.

22. In a lock nut machine, means to insert a wire endwise into an aperture seat therefor in the nut the diameter of said aperture being substantially equal to the diameter of the wire, a nut carrier to bring the nut to said means, a movable device adjacent said means to engage the nut to register said seat with said means, and means to actuate said device into and out of engagement with the nut.

23. In a lock nut machine, means to hold the nuts in wire-receiving position, a device to insert locking wires into apertures beside and substantially parallel with the bolt holes of the nuts, and means for deforming each nut, while the nut is at the wire-receiving position, to lock the wire therein.

24. In a lock nut machine, an inserting mechanism to insert and hold a wire in a seat in each nut, a device for deforming the nuts to lock the wires therein, while said inserting mechanism holds the wires in their seats, and means for releasing the locked wires from said inserting mechanism after said deforming device has acted.

25. In a lock nut machine, means to hold in wire-receiving position a nut having a seat for a locking wire, means for feeding a long wire into said seat, and means to deform the nut to lock the wire therein and to cut the wire.

26. In a lock nut machine, means to hold in wire-receiving position a nut having a seat for a locking wire, means for feeding a long wire into said seat, means to deform the nut to lock the wire therein, and means to cut the wire after said nut-deforming means has acted.

27. In a lock nut machine, means to hold in wire-receiving position a nut having a seat for a locking wire, means for feeding a long wire into said seat, and means to deform the nut to lock the wire therein, to cut the wire, and to deform the long wire adjacent the point where said cutting is done.

28. The subject matter of claim 25, characterized by the fact that said means for feeding a long wire includes a non-positive friction drive to move the wire lengthwise.

29. The subject matter of claim 25, characterized by the fact that said means for feeding a long wire includes means having non-positive engagement with the wire for intermittently moving the wire lengthwise of itself and into the wire seat in the nut.

30. In a lock nut machine, a wire feeder to feed a long wire into an aperture in a nut, the wire protruding from the face of the nut which is adjacent the cutting tool hereinafter mentioned, a cutting tool to cut the wire, and means to space the cutting tool a predetermined distance from the adjacent face of the nut regardless of the thickness of the nut.

31. In a lock nut machine, a wire feeder to feed a long wire into an aperture in a nut located at one side of the bolt hole, a cutting tool to cut the wire, a carriage movable toward and from the nut, the cutting tool being mounted on said carriage, and means to engage the adjacent face of the nut to fix the position of the carriage at the time said cutting tool cuts the wire.

32. In a lock nut machine, a wire feeder to feed a long wire into an aperture in a nut located at one side of the bolt hole, means to cut the wire, a carriage on which said means is mounted, means to move said carriage toward the nut, and means on the carriage to engage the adjacent face of the nut to space the cutting tool a predetermined distance from the nut.

33. In a lock nut machine, means to insert locking wires into apertures beside and substantially parallel to the bolt holes of the nuts, a part of each wire projecting from the nut, and a hammer to strike the projecting wires to bend the same into a position substantially parallel to the adjacent face of the respective nut.

34. In a lock nut machine, means to insert locking wires into apertures in the nuts at one side of the bolt holes of the nuts, a part of each wire projecting from the nut, a hammer to strike the projecting wires to bend the same into a position substantially parallel to the adjacent face of the respective nut, a spring to thrust the hammer against wires, and means to retract and release the hammer.

35. The subject matter of claim 34, characterized by the fact that the hammer is a sliding hammer.

36. In a lock nut machine, a nut carrier, means at the path of travel of said carrier to insert locking wires into apertures in the nuts at one side of the bolt holes of the nuts, means at a later point in the travel of said nut carrier to reduce the ends of the exposed legs of the wires, and means to move the last mentioned means to and from operating position as frequently as said carrier brings nuts to said later point.

37. In a lock nut machine, means to insert locking wires in apertures in the nuts at one side of the bolt holes of the nuts, and means to reduce the ends of the exposed legs of the locking wires which are to engage the bolts including a grinding tool, means to drive said tool, and means to move said tool to and from operating position.

38. In a lock nut machine, a nut carrier, means at the path of travel of said carrier to insert locking wires into apertures in the nuts at one side of the bolt holes of the nuts, a movable carriage at a later point in the path of travel of said nut carrier, a grinding tool on said carriage to reduce the ends of the exposed legs of the inserted wires which are to engage the bolts, and means to move said carriage to move said grinding tool to and from operating position as frequently as said nut carrier brings nuts to said later point.

39. In a lock nut machine, a movable nut carrier having posts at one face to support the nuts, means at the path of travel of said carrier to insert locking wires into apertures in the nuts located at one side of the bolt holes of the nuts, and movable finger means, movable substantially transversely of and across said face of the nut carrier, to thrust the nuts away from said carrier and face thereof and off said posts.

40. In a lock nut machine, a nut carrier capable of carrying a plurality of nuts simultaneously, means to advance said carrier intermittently, means at one station to furnish nuts to said carrier while the latter is at rest, means at a second station to insert a long wire into apertures in the nuts at one side of the bolt holes of the nuts, deform the nuts to lock the wire therein, and cut the wire, all while said carrier is at rest, means at a later point in the path of travel of said carrier to bend the exposed legs of the wires to their final positions, and means at a still later point in the path of travel of the nut carrier to discharge the nuts from the nut carrier.

41. The subject matter of claim 40, in combination with means, at a station farther along in the path of travel of said nut carrier than the point whereat the exposed legs of the wires are bent to their final positions, to reduce the ends of said exposed legs, and means to operate said end-reducing means on the wires while said nut carrier is at rest.

GEO. A. TILSHER.
SAMUEL C. DICKERHOFF, Jr.